April 17, 1934. W. L. HEHN 1,954,996
APPARATUS FOR TESTING MAGNETIZABLE OBJECTS
Filed Dec. 15, 1931
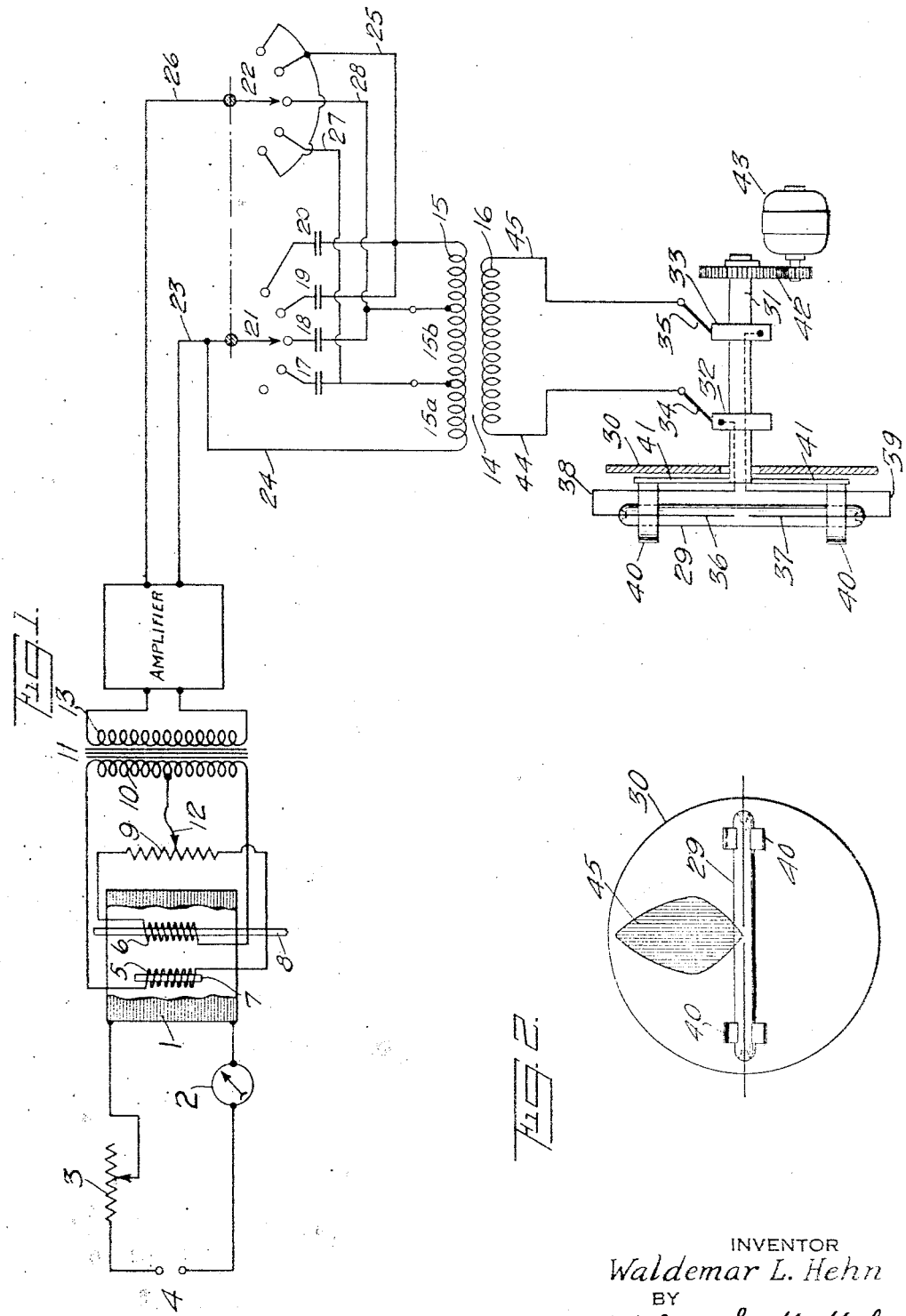
INVENTOR
Waldemar L. Hehn
BY
Bartlett, Eyre, Scott & Keel
ATTORNEY

UNITED STATES PATENT OFFICE 1,954,996

APPARATUS FOR TESTING MAGNETIZABLE OBJECTS

Waldemar L. Hehn, New York, N. Y., assignor to Magnetic Analysis Corporation, Long Island City, N. Y., a corporation of New York Application December 15, 1931, Serial No. 581,104

7 Claims. (Cl. 175—183)

The present invention relates to the art of magnetic analysis and comprises a new apparatus for testing magnetizable objects such as wires, rods, or the like to determine physical and chemical properties thereof.

As in methods heretofore employed in this art, the present method involves the comparison of the wire or rod to be tested with a standard body by a study of the current induced in a pair of exploring or secondary coils connected in opposition and influenced by the test body and the standard respectively. With former methods the test body and standard were located in what were considered equal magnetic fields but which actually were equal only before insertion of the test body and standard; inequality of the fields being occasioned by the reaction of the test body upon the primary or energizing coil. Even when but a single energizing coil was employed, as in the so-called null method where different portions of the same body were compared, there was no equality of the fields acting upon the portions under comparison as no compensation for local reactions from the body was provided. According to the present invention the errors introduced by reactions from either or both of the test and standard bodies are eliminated by using a single energizing coil to produce the magnetic field and locating the two bodies being compared symmetrically with respect to the axis of the energizing coil and at equal distances from one end of the coil so as to have corresponding turns of the exploring coils in the same planes. Furthermore the method as preferably practiced includes initial adjustment to zero of the induced differential current by preliminary comparison of two standard bodies, the amplification of the induced current and the selection and indication of various harmonics of the induced current for determination of specific characteristic of the test body.

The apparatus for carrying out the method and the method itself can best be understood by reference to the accompanying drawing of which, Fig. 1 illustrates diagrammatically the preferred combination of apparatus for practicing the method; and Fig. 2 is a front view of the indicating device of Fig. 1 showing an indication of a stress or strain in the test specimen.

Referring to the drawing, the energizing coil 1 for producing the magnetic field is connected through an ammeter 2 and adjustable resistor 3 to any suitable source of alternating voltage indicated by the terminals 4. The alternating voltage may have any convenient frequency. For example, the terminals 4 may be connected to an 110 volt alternating light circuit. The coil 1 is shown broken away in Fig. 1 to disclose the two secondary or exploring coils 5 and 6 within which are inserted two magnetizable specimens 7 and 8. Specimen 7 may be a standard rod and specimen 8 a rod to be tested. Coils 5 and 6 are oppositely wound so as to be oppositely influenced by the alternating field within coil 1. Moreover, in accordance with the invention coils 5 and 6 are symmetrically arranged relative to the axis of the energizing coil and each secondary is located at an equal distance from one end of the primary coil so that any reaction upon coil 1 due to a change in either of specimens 7 or 8 will effect equally the portions of the field in which coils 5 and 6 are located. Coils 5 and 6 should be of equal resistance, equal diameter, and of the same number of turns. Preferably specimens 7 and 8 should be of sufficient length to extend beyond the ends of the respective coils 5 and 6 sufficiently to avoid the "end effect". If one or the other specimen does not extend beyond the coil sufficient for this purpose, the other specimen should be withdrawn so that its end terminates at the same relative position as the shorter specimen. Although coils 5 and 6 have been shown located substantially mid-way of the length of coil 1 it will be understood that the two coils 5 and 6 may be located at any distance from the end of the energizing coil so long as they are both at the same distance so as to have corresponding turns in the same planes.

A resistor or potentiometer 9 is connected between the upper end of coil 6 and the lower end of coil 5 and the primary 10 of a differentially wound transformer 11 is connected between the upper end of coil 5 and the lower end of coil 6; the center connection of primary 10 being connected to a tap 12 along resistor 9. With this arrangement, tap 12 may be adjusted along resistor 9 until the current in the secondary 13 of transformer 11, when two like standards are inserted within these coils, is zero, indicating that the currents induced in coils 5 and 6 are equal and opposite; the current in the secondary 13 being amplified, filtered and indicated by apparatus hereinafter to be described. Theoretically, if coils 5 and 6 are exactly alike, and the two standards are identical, no current will flow in the output circuit of transformer 11 when tap 12 is connected to the mid point of resistor 9. Practically however, adjustment of tap 12 along resistor 9 will be required before minimum or zero output current can be obtained.

Preferably the output current is amplified by any suitable type of amplifying device and is then filtered and indicated. The filter is preferably one which lends itself to ready adjustment so as to transmit selected harmonics of the output current. In the preferred form illustrated the filter comprises an air core transformer 14, consisting of a primary winding 15 of negligible resistance, tapped at two points to permit variation of the inductance included in the circuit and of a secondary winding 16, preferably having a greater number of turns than the primary, connected to the indicating device hereinafter to be described, a plurality of capacities 17, 18, 19 and 20 and two rotary switches 21 and 22 arranged for conjoint operation to vary the total capacity and inductance of the circuit. As shown, each of the switches 21 and 22, in the specific embodiment illustrated, comprises a rotary arm adapted to make contact in different positions with one or another of five fixed contacts. When the rotary arms engage the extreme left hand contact the filter capacities are cut out entirely, wire 23, leading from the amplifier to the rotary switch 21, being connected through wire 24 to the primary 15, the circuit being completed by means of wire 25, arm of switch 22 and wire 26 connecting the rotary arm of switch 22 with the amplifier.

When the rotary arms are moved from the extreme left hand fixed contacts to engage the next pair of contacts, a filter circuit including portion 15a of primary 15 in parallel with capacity 17 is connected between wires 23 and 26; one branch of the filter circuit being from wire 23, arm of switch 21, condenser 17, wire 27, arm of switch 22 to wire 26 and the other branch of the filter circuit being from wire 23 through wire 24 primary portion 15a, wire 27, arm of switch 22 to wire 26. In the next position of the rotary switches, that illustrated in the drawing, the filter comprises portions 15a and 15b of primary 15 in parallel with capacity 18, the circuit being completed by means of wire 28, whereas in the last two positions the filter is composed of the total inductance of primary 15 in parallel with capacities 19 or 20 depending upon the position of the arms of the switches. As indicated by the dot and dash line the arms of the rotary switches are preferably inter-connected for conjoint movement.

The above described adjustable filter gives in a convenient form a wide range of combinations of inductance and capacity and is of particular value when it is desired to select one harmonic after another of the output current for transmission to the indicating device. Obviously, of course, other types of adjustable filters could be employed if desired, or different filters could be used whenever different harmonics were to be transmitted to the indicator.

The indicating device comprises a glow tube 29 filled with neon or similar gas adapted to indicate visually the passage of current between electrodes in the tube, a reflector 30 and a rotatable shaft 31 carrying contact rings 32 and 33 with which brushes 34 and 35 make contact. Electrodes 36 and 37 within tube 29 are only slightly separated within the tube and are connected through wires 38 and 39 with rings 32 and 33 respectively; wires 38 and 39 being led through the center of shaft 31 to the respective rings and being suitably insulated from the shaft. Tube 29 is supported in any suitable manner upon shaft 31; the supporting means illustrated being spring clips 40 rigidly connected to shaft 31 by rods 41.

Shaft 31 is rotated through gears 42 by a synchronous motor 43 driven at the frequency of the excitation voltage for coil 1. The secondary 16 of filter transformer 14 is connected to brush 34 by means of wire 44 and to brush 35 by means of wire 45. When a potential difference of sufficient magnitude is impressed across the electrodes 36 and 37, a glow appears in the tube at the gap between and along the electrodes. The extent of the glow depends upon the intensity of the impressed potential difference. If tube 29 were stationary and an alternating potential such as that transmitted by transformer 13 were impressed across the tube, the glow would appear symmetrically disposed about the gap and its extent would correspond with the peak value of the alternating voltage wave. If, however, tube 29 is rotated synchronously with the frequency of the alternating excitation voltage a spot of light such as indicated at 45 in Fig. 2 will appear upon the reflector 30. A glowing spot such as that illustrated appears when the alternating voltage impressed upon the tube is in phase with the impressed voltage; the peak of the glow along one electrode occurring when the tube has been rotated 90 degrees from zero position. As the peak of the glow along the other electrode occurs when the voltage is in opposite phase and the tube has been rotated through 180 degrees more the peak glows will appear along the same radial line of the reflector. Similarly, glows corresponding to less than the peak voltage, of equal intensity but opposite phase will be reflected from the same points of the reflector; resulting, due to persistance of vision, in the appearance of a peaked glowing spot upon the reflector. When the phase of the voltage impressed across the tube departs from that of the impressed voltage, the peak of the spot will be displaced in one direction or the other from the vertical position illustrated in Fig. 2.

The above described indicator in combination with the parts of the apparatus heretofore described and when used as hereinafter described gives a visual representation from which physical and chemical properties of unknown magnetizable bodies may be determined.

The preferred method, as applied to the testing of a rod, for example, is as follows: Two like specimens are inserted in the test coils 5 and 6. Alternating voltage of a suitable frequency, preferably a frequency in the neighborhood of 60 cycles per second, is applied across terminals 4 and the primary current adjusted by resistor 3 to a suitable value. Motor 43 is then energized and suitably synchronized with the applied voltage to rotate tube 29 in phase therewith. Switches 21 and 22 are then turned to such positions as will include the proper inductance and capacity in the filter for transmission of the fundamental or first harmonic of the amplifier output current to the indicator. If any glow now appears upon the reflector 30, tap 12 is adjusted along resistor 9 until the glow vanishes, indicating equal and opposite currents induced in coils 5 and 6. The test specimen 8 is now substituted for one of the standards and moved along at intervals through the coil in order to subject each portion to test. At each position of the test piece, if a glowing spot appears, its magnitude and its position upon the shield are noted. The test specimen is then removed and the standard reinserted in coil 6, the filter changed to transmit the third harmonic of the output current and tap 12 repositioned along resistor 9 until no glow appears in the tube. The test piece is then again substituted for the standard in coil 6 and moved through the coil with observation of the glow as before. The same procedure may be followed with the filter adjusted for the fifth harmonic and, if desired, for the seventh harmonic, but ordinarily sufficient information will be obtained without exceeding the third harmonic, or at most the fifth harmonic.

The interpretation of the indications given by the indicating device do not require any particular skill. Different defects show up differently in different harmonics as will be readily found by experiment. As a guide to such interpretation the following information which applicant has gained as a result of the practice of his method will be given.

A specimen having a high carbon content as compared with the standard will cause a glow of relatively high peak value and with a relatively large phase displacement to occur upon the reflector irrespective of the harmonic transmitted to the indicator. Stresses and strains in the test specimen result in spots of relatively high peak value but no phase displacement for all harmonics. Longitudinal cracks and fissures cause but small change in the fundamental, unless the cracks are very deep, but show up as spots of relatively high intensity at the upper harmonics and with a slight phase displacement. A transverse crack shows up at the fundamental frequency as a momentary spot of high intensity and large phase displacement as the test sample is moved through the coil. Thus the present invention provides a method and apparatus which not only indicates by the presence or absence of a glow that a specimen is unlike or like a standard respectively but also yields additional information as to the character of the defect and as to its relative magnitude.

The preferred method of the invention, together with the preferred form of apparatus for practicing the method has now been described. The invention in its broadest aspects, however, is not limited to the precise method described as various steps thereof could be modified or omitted if less precise information is required or if indications of another nature are preferred. For example, if it is desired to determine merely whether or not the test specimen departs from the standard, and the particular character of defest is immaterial, tube 29 need not be rotated and the filter may or may not be included in the circuit. On the other hand, if a different type of visual indication is desired, such for example as is given by a moving coil oscillograph, the specific indicating device illustrated could be replaced by a suitable oscillograph and the filter circuit could be modified so as to permit of insertion of any desired inductance and capacity in series instead of in parallel between the amplifier and indicator or the filter could be omitted depending upon whether or not it was desired to select separate harmonics of the output current for study. The use of an amplifier is not essential under all circumstances but where any great sensitivity of the apparatus is desired its use is preferred, particularly when separate harmonics are to be studied either by an oscillograph or by the rotating glow tube illustrated.

Thus, in its broadest aspects the invention is not limited to any particular method of indicating the differential of the currents induced in the secondary coils surrounding the test and standard specimens but is primarily concerned with the symmetrical positioning of the secondary coils about the axis of the single energizing coil at a uniform distance from one end thereof to prevent inequality of the magnetic fields occasioned by reaction from the specimens and hitherto found to be an unavoidable source of error in the art of magnetic analysis.

While alternating current is preferably employed for the creation of the fluctuating magnetic field any fluctuating current, such as a suitably varying direct current, or a periodically interrupted direct current could be employed for the purpose.

The indicating device is not claimed in the present application except when used in combination with applicant's novel arrangement for creating the differential current to be indicated.

The following is claimed:

1. Apparatus for simultaneously comparing two magnetizable bodies including in combination a primary energizing coil and a source of fluctuating electromotive force therefor, a pair of like secondary coils surrounding said two magnetizable bodies and positioned within said primary coil symmetrically with respect to the axis thereof, at an equal distance from one end thereof and with their axes parallel to the axis of the primary coil and an output circuit so connected to said secondary coils as to be responsive to the differential of the currents induced therein.

2. Apparatus according to claim 1 wherein said output circuit includes a transformer having a differentially wound primary, and wherein a resistor, having a variable tap connected to the center point of said primary, is connected at its ends to one end of each of said secondary coils, the other end of each of the secondary coils being connected to opposite ends of said primary whereby the output current of said transformer corresponding to the differential of the currents induced in said secondary coils may be varied by adjustment of the tap along said resistor.

3. Apparatus according to claim 1 including in said output circuit an amplifier, an electrical filter, and an indicating device comprising a gas filled tube adapted to be rotated synchronously with the fluctuations of the magnetic field to indicate visually the magnitude and phase displacement of the output current.

4. Apparatus for simultaneously comparing two magnetizable objects comprising in combination a cylindrical primary coil and means for supplying fluctuating current thereto, a pair of like secondary coils surrounding said two objects and having their axes parallel to the axis of said primary coil and positioned within said primary coil at equal distances from one end thereof and symmetrically with respect to the axis thereof and means electrically connected with said secondary coils for adjusting to zero the differential of the currents induced therein..

5. Apparatus for testing magnetizable bodies comprising in combination means for creating a single fluctuating field, a pair of secondary coils therein so symmetrically positioned as to cause local reactions from said coils upon said field creating means to be reflected equally upon the portions of the field effecting the secondary coils, means for creating a current varying as a function of the differential of the currents induced in said coils, means for adjusting the relation between the currents induced in said coils to minimize said created current, a device for indicating said created current and an electrical filter interposed between said device and said means for creating a current varying with the differential of the induced currents whereby a selected harmonic of the created current may be transmitted to said indicating device.

6. Apparatus for testing magnetizable objects comprising in combination a primary coil and means for supplying fluctuating current thereto, a pair of like secondary coils having their axes parallel to the axis of said primary coil and positioned within said primary coil at equal distances from one end thereof and symmetrically with respect to the axis thereof, a transformer, an adjustable filter and a device for visually indicating the current therethrough, said secondary coils being oppositely connected to the primary of said transformer and said adjustable filter being connected between the secondary of said transformer and said indicating device and means associated with the primary of said transformer for adjusting the relation of the currents induced in said secondary coils to minimize the filtered current delivered to said device.

7. The combination according to claim 6 wherein said indicating device includes a gas filled tube and means adapted to operate in synchronism with the means for supplying current to the primary coil for rotating said tube, said tube including electrodes connected through said filter across the secondary winding of said transformer.

WALDEMAR L. HEHN.